(12) United States Patent
Thiruvenkadam et al.

(10) Patent No.: US 7,502,502 B2
(45) Date of Patent: Mar. 10, 2009

(54) SYSTEM AND METHOD FOR PDE-BASED MULTIPHASE SEGMENTATION

(75) Inventors: Sheshadri Thiruvenkadam, Los Angeles, CA (US); Christophe Chefd'hotel, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 675 days.

(21) Appl. No.: 11/328,911

(22) Filed: Jan. 10, 2006

(65) Prior Publication Data

US 2006/0188158 A1 Aug. 24, 2006

Related U.S. Application Data

(60) Provisional application No. 60/644,140, filed on Jan. 14, 2005.

(51) Int. Cl.
G06K 9/00 (2006.01)
G06K 9/34 (2006.01)
G06K 9/38 (2006.01)

(52) U.S. Cl. .................... 382/128; 382/173

(58) Field of Classification Search ......... 382/128–133, 382/171, 173, 199, 220, 254, 272, 274, 284; 600/407, 410, 420; 345/419
See application file for complete search history.

(56) References Cited

U.S. PATENT DOCUMENTS

| | | | |
|---|---|---|---|
| 5,790,690 A * | 8/1998 | Doi et al. ................... | 382/128 |
| 6,035,056 A | 3/2000 | Karssemeijer et al. | |
| 6,535,623 B1 * | 3/2003 | Tannenbaum et al. ....... | 382/128 |
| 6,885,762 B2 * | 4/2005 | Saha et al. .................. | 382/131 |
| 7,079,674 B2 * | 7/2006 | Paragios et al. ............. | 382/128 |
| 7,397,934 B2 * | 7/2008 | Bloch et al. ................. | 382/128 |
| 2003/0053667 A1 | 3/2003 | Paragios et al. | |
| 2006/0050959 A1 * | 3/2006 | Grady et al. ................ | 382/173 |
| 2006/0056701 A1 * | 3/2006 | Unal et al. .................. | 382/199 |
| 2006/0147115 A1 * | 7/2006 | Grady ........................ | 382/173 |
| 2006/0158447 A1 * | 7/2006 | McGraw et al. ............. | 345/419 |
| 2006/0188158 A1 * | 8/2006 | Thiruvenkadam et al. ... | 382/171 |

OTHER PUBLICATIONS

Hewer, Gary A. et al., "Variational Image Segmentation Using Boundary Functions," IEEE Transactions on Image Processing(1998) 7:9.
Ackah Miezan A., "Discrete Models for Energy Minimizing Segmentation," IEEE (1993) pp. 200-207.
International Search Report.

* cited by examiner

*Primary Examiner*—Amir Alavi (57) ABSTRACT

A method for segmenting a digitized medical image including providing a digitized image comprising a plurality of intensities corresponding to a domain of points on a n-dimensional grid, modeling the segmentation phases of said image with $2^k$ weighting functions defined as a product of k unknown auxiliary functions, minimizing an energy functional of said weighting functions and said auxiliary functions to derive k gradient flow equations for said auxiliary functions, numerically integrating said gradient flow equations wherein solutions for the k unknown auxiliary functions are obtained, and partitioning said image into segments based on a membership of each image point in each of said weighting functions.

22 Claims, 3 Drawing Sheets

SYSTEM AND METHOD FOR PDE-BASED MULTIPHASE SEGMENTATION

CROSS REFERENCE TO RELATED UNITED STATES APPLICATIONS

This application claims priority from "A PDE-Based Multiphase Segmentation Algorithm for Medical Images", U.S. Provisional Application No. 60/644,140 of Sheshadri Thiruvenkadam, et al., filed Jan. 14, 2005, the contents of which are incorporated herein by reference.

TECHNICAL FIELD

This invention is directed to the segmentation of objects in digital medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

The process of classifying, identifying, and characterizing image structures is known as segmentation. Once anatomical regions and structures are identified by analyzing pixels and/or voxels, subsequent processing and analysis exploiting regional characteristics and features can be applied to relevant areas, thus improving both accuracy and efficiency of the imaging system. The wide variety of object appearance characteristics and boundary geometry makes image segmentation a very difficult task. In past decades, a number of promising general-purpose approaches, such as classification/labeling/clustering and curve-evolution, have been proposed to solve this problem. In practice, however, structural assumptions of the target objects are often available beforehand thus can be exploited as a prior. The successful incorporation of such prior information plays a key role for realizing efficient and accurate segmentation solutions in general.

Variational and PDE methods have been widely used in image segmentation in the past few years. The basic idea is to represent an image as a $R^2$ function that satisfies a time dependent PDE that characterizes the problem. The solution of the differential equation gives the processed image at the appropriate scale. The PDE can be derived by minimizing an energy functional, which can be formulated as:

$$\text{Arg}\{\min_u F(u)\},$$

where F is a given energy computed over the image u. Let F'(u) denote the Euler-Lagrange derivative. The necessary condition for u to be a minimizer of F is that F'(u)=0, where the (local) minima may be computed via the steady state solution of the equation $$u_t = -F'(u),$$

where t is an artificial time-marching parameter.

The use of variational and PDE methods in image analysis leads to modeling images in a continuous domain. This simplifies the formalism, which becomes grid independent and isotropic. Conversely, when the image is represented as a continuous signal, PDEs can be seen as the iteration of local filters with an infinitesimal neighborhood. This interpretation of PDE's allows one to unify and classify a number of the known iterated filters, as well as to derive new ones. Many of the PDEs used in image processing and computer vision are based on moving curves and surfaces with curvature-based velocities. In this area, level set methods have proven to be useful. The basic idea is to represent the curves or surfaces as the zero level set of a higher dimensional hypersurface. This technique not only provides accurate numerical implementations but can also handle topological change easily.

Multidimensional segmentation has shown promise in the enhancement of image contrast between normal tissue distributions. Research in these techniques has been directed toward more objective measures of normal tissue distribution as diagnostic indicators of disease processes. Similarly, multi-parameter segmentation methods can improve the boundary definition between pathology, edema, and scar tissue that have very similar MR relaxation parameters and that generally present a more difficult segmentation problem than that required for normal tissue distributions. Their application to 3D image data allows improved 3D display of tumor data with a more objective criterion for the removal of surrounding normal tissue.

The development of medical data segmentation solutions as applied to computer aided diagnosis applications emphasizes the overall system performance, including user-interaction factors. Clustering algorithms like the fuzzy C-means (FCM) have been frequently used for image segmentation, especially when the total number of classes is known. In order to enforce spatial continuity, a smoothness penalty function or a Markov random field prior can be used. State-of-the-art segmentation techniques combine probability based or clustering based techniques with active contours. Typically, these techniques use FCM in the preprocessing stage and then follow it with active contours to capture the geometry of the segmentation.

SUMMARY OF THE INVENTION

Exemplary embodiments of the invention as described herein generally include methods and systems for automatically segmenting medical images into a fixed number of classes. These classes form a partition of the image domain into connected regions, and are defined such that intensity values within a class have limited variance. The solution is obtained by minimization of an energy functional. Methods according to embodiments of the invention enable the use of fuzzy classification and active contours in a single variational framework. This enables the use of tools from both deformable geometry and clustering, thus providing useful technique for unsupervised segmentation.

According to an aspect of the invention, there is provided a method for segmenting a digitized medical image including providing a digitized image comprising a plurality of intensities corresponding to a domain of points on a n-dimensional grid, modeling the segmentation phases of said image with $2^k$ weighting functions defined as a product of k unknown auxiliary functions, minimizing an energy functional of said weighting functions and said auxiliary functions to derive k gradient flow equations for said auxiliary functions, numerically integrating said gradient flow equations wherein solutions for the k unknown auxiliary functions are obtained, and partitioning said image into segments based on a membership of each image point in each of said weighting functions.

According to a further aspect of the invention, the method comprises deriving Euler-Lagrange equations for minimizing an integrand of said energy functional, wherein said gradient flow equations are derived from said Euler Lagrange equations.

According to a further aspect of the invention, the energy functional E includes the terms $$E = \int_\Omega \left( \sum_{i=1}^{2^k} A_i \cdot \omega_i \cdot (I-\mu_i)^2 \right) dx + \lambda \int_\Omega \left( \sum_{i=1}^{k} \|\nabla L_i\|^2 \right) dx,$$

wherein I represents the image, $\Omega$ represents the image domain, $A_i$ represents the weighting functions, $\mu_i$ represent the mean intensity values for each of $2^k$ segments, $\lambda$ is an empirically determined constant, and $L_i$ represents the unknown auxiliary functions.

According to a further aspect of the invention, the method comprises modeling said image intensities as a sum of $2^k$ probability distribution functions and computing said mean values from each of said distribution functions.

According to a further aspect of the invention, the probability distribution functions are Gaussian functions, wherein each said function models a portion of said image intensity range.

According to a further aspect of the invention, the weighting functions satisfy a unit norm constraint.

According to a further aspect of the invention, each said weighting function $A_i$ is defined in terms of said auxiliary functions L according to $$A_i = \prod_{j=1}^{k} M_j^2,$$

wherein $M_i = \cos(L_i)$ or $\sin(L_i)$.

According to a further aspect of the invention, the gradient flow equations include the terms $$\frac{dL_i(t)}{dt} = -\frac{1}{\lambda} \sin(2L_i(t)) \sum_{j=1}^{2^k} \sigma_{ij} \omega_j (I-\mu_j)^2 \prod_{l=1, l\neq i}^{k} M^2(L_l(t)) + \Delta L_i(t),$$

wherein I represents the image, $\mu_i$ represent the mean intensity values for each of $2^k$ segments, $\lambda$ is an empirically determined constant, $\omega_j$ is empirically chosen to penalize a segment with a high intensity variance, $\sigma_{ij}=1$ if $M(L_i)=\cos(L_i)$ and $\sigma_{ij}=-1$ if $M(L_i)=\sin(L_i)$ for i=j, and wherein $$\frac{\partial \Delta L_i(t)}{\partial n} = 0$$

on $\partial\Omega$.

According to a further aspect of the invention, the gradient flow equations are integrated by a semi-implicit method.

According to a further aspect of the invention, partitioning said image comprises defining segments $\Omega_i$ according to $\Omega_i = \{x | \Pi_{j=1, j\neq i}^{2^k} (A_i - A_j) > 0\}$, wherein x is a point in said image domain, and $A_i$ and $A_j$ are weighting functions.

According to another aspect of the invention, there is provided a program storage device readable by a computer, tangibly embodying a program of instructions executable by the computer to perform the method steps for segmenting a digitized medical image.

DETAILED DESCRIPTION OF THE PREFERRED EMBODIMENTS

Exemplary embodiments of the invention as described herein generally include systems and methods for automatically segmenting medical images into a fixed number of classes. A method according to an embodiment of the invention enables the use of fuzzy classifications and active contours in a single variational framework. However, specific structural and functional details disclosed herein are merely representative for purposes of describing example embodiments of the present invention. Further embodiments of the invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular-forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An image according to an embodiment of the invention can be modeled as a scalar function $I:\Omega \rightarrow \Re$, on a 3D domain $\Omega$ of points or voxels, where $\Omega \subset \Re^3$. A 2k-phase segmentation requires k auxiliary indicator functions. These indicator functions are used to characterize the degree of membership of a voxel in each class. For expository purposes, a 4-phase case, with corresponding auxiliary functions L and M, is presented herein. The phases of this case are determined by the image class intensity values $\mu_a$, $\mu_b$, $\mu_c$, and $\mu_d$. This 4-phase case is exemplary and non-limiting, and other 2k-phase segmentation are within the scope of other embodiments of the invention. An energy functional according to an embodiment of the invention can be defined as follows:

$$E[\mu_a,\mu_b,\mu_c,\mu_d, L,M] = \int_\Omega (A \cdot \omega_a \cdot (I-\mu_a)^2 + B \cdot \omega_b \cdot (I-\mu_b)^2 + C \cdot \omega_c \cdot (I-\mu_c)^2 + D \cdot \omega_d \cdot (I-\mu_d)^2 + \lambda \int_\Omega (\|\nabla L\|^2 + \|\nabla M\|^2) dx,$$

where
$A = \cos(L)^2 \cos(M)^2$,
$B = \cos(L)^2 \sin(M)^2$,
$C = \sin(L)^2 \cos(M)^2$,
$D = \sin(L)^2 \sin(M)^2$.

The above defined weight functions define all the phases. For example, consider the function $\phi = (A-B)(A-C)(A-D)$. This is a level set function representing the first phase. This function can be used to add geometric constraints on the segmentation, such as area, length, curvature etc.

The parameters $\lambda$ control the smoothness of the phases, and by extension the regularity of the segmented regions. The parameters $\omega_a$, $\omega_b$, $\omega_c$ and $\omega_d$ are used to penalize classes with high intensity variance.

The auxiliary indicator functions need to be scalar functions that have a unit norm. A natural way to enforce this constraint is by using trigonometric functions. For 2k phases, the scalar functions can be chosen to be of the form $$A_i = \prod_{j=1}^{k} M_{i,j}^2,$$

where $M_{ij} = \cos(L_j)$ or $\sin(L_j)$. Hence, there are 2k scalar weight functions $A_i$ such that $$\Sigma_{i=1}^{2^k} A_i = 1.$$

In the general case of 2k-phases, one can obtain a partition of the domain into disjoint components $\Omega = \cup_{i=1}^{2^k} \Omega_i$ where $\Omega_i = \{x | \Pi_{j=1, j \neq i}^{2^k} (A_i - A_j) > 0\}$. Other embodiments of the invention extend to combinations of trigonometric functions that are used to generate an arbitrary number of phases.

In one exemplary, non-limiting embodiment, that of case k=2, a necessary condition of optimally is that the indicator functions satisfy the following corresponding Euler-Lagrange equations:

$$\lambda \Delta L = \sin(2L) \lfloor \cos(M)^2 \omega_c (I-\mu_c)^2 + \sin(M)^2 \omega_d (I-\mu_d)^2 - \cos(M)^2 \omega_a (I-\mu_a)^2 - \sin(M)^2 \omega_b (I-\mu_b) \lambda \Delta M = \sin(2M) \lfloor \cos(L)^2 \omega_b (I-\mu_b)^2 + \sin(L)^2 \omega_d (I-\mu_d)^2 - \cos(L)^2 \omega_a (I-\mu_a)^2 - \sin(L)^2 \omega_c (I-\mu_c)^2$$

with $\dfrac{\partial L}{\partial n} = \dfrac{\partial M}{\partial n} = 0$ on $\partial \Omega$, and $$\mu_a = \dfrac{\int_\Omega A \cdot I \, dx}{\int_\Omega A \, dx},$$

$$\mu_b = \dfrac{\int_\Omega B \cdot I \, dx}{\int_\Omega B \, dx},$$

$$\mu_c = \dfrac{\int_\Omega C \cdot I \, dx}{\int_\Omega C \, dx},$$

$$\mu_d = \dfrac{\int_\Omega D \cdot I \, dx}{\int_\Omega D \, dx}.$$

These Euler-Lagrange equations for L and M are of the type $$f(u) - \Delta u = 0, \frac{\partial u}{\partial n} = 0 \text{ on } \partial \Omega.$$

The corresponding gradient flow is given by $$u_t(t) = -f(u)(t) + \Delta u(t),$$

$$\frac{\partial u(t)}{\partial n} = 0.$$

This equation can be integrated using a semi-implicit scheme, according to an embodiment of the invention. An exemplary, non-limiting formulation in 2D is:

$$u_{i,j}^{n+1} = u_{i,j}^n - \Delta t(f(u_{i,j}^n) - (u_{i+1,j}^n + u_{i-1,j}^n + u_{i,j+1}^n + u_{i,j-1}^n - 4u_{i,j}^{n+1})),$$

$$u_{i,j}^{n+1}(1+4\Delta t) = u_{i,j}^n - \Delta t(f(u_{i,j}^n) - (u_{i+1,j}^n + u_{i-1,j}^n + u_{i,j+1}^n + u_{i,j-1}^n)).$$

Figure 3:
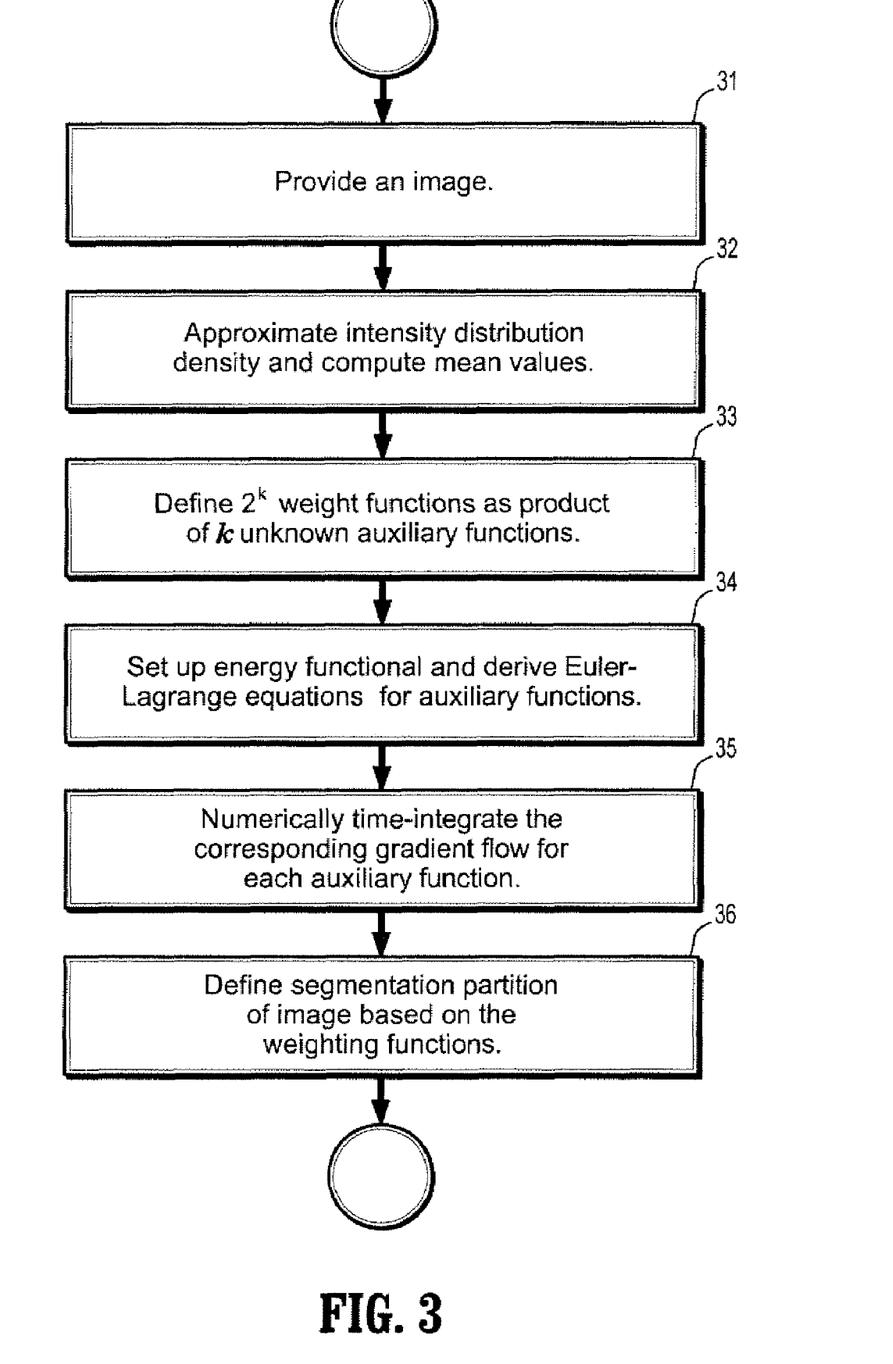
FIG. 3 is a flow chart of an exemplary method for multiphase segmentation, according to an embodiment of the invention.

A flow chart of an exemplary method for multiphase segmentation, according to an embodiment of the invention, is presented in FIG. 3. Referring now to the figure, a segmentation process begins at step 31 by providing an image. An exemplary image is defined on 2- or 3-D domain grid of points, with a scalar, gray-level intensity defined for each point. Note that the image range need not be a scalar, and a vector-valued image, whose values represent, e.g., color intensities, is within the scope of an embodiment of the invention. At step 32, the image intensity is modeled by one or more probability distribution functions. An exemplary, non-limiting probability distribution function (pdf) is a Gaussian function. For a $2^k$ segmentation, the image intensity is modeled by the sum of $2^k$ pdfs, where each pdf models a portion of the image's intensity range. The mean values of the pdfs are then computed. At step 33, $2^k$ weighting functions $A_i$ are defined as products of k unknown auxiliary indicator functions $L_j$:

$$A_i = \prod_{j=1}^{k} M(L_j)^2.$$

The functions M should be chosen for the $A_i$'s to satisfy a unit norm constraint: $\Sigma_{i=1}^{2^k} A_i = 1$. In an exemplary, non-limiting embodiment of the present invention, $M(L_j) = \cos(L_j)$ or $\sin(L_j)$. At step 34, an energy functional of the auxiliary functions is defined:

$$E = \int_\Omega \left( \sum_{i=1}^{2^k} A_i \cdot \omega_i \cdot (I - \mu_i)^2 \right) dx + \lambda \int_\Omega \left( \sum_{i=1}^{k} \|\nabla L_i\|^2 \right) dx,$$

where $\Omega$ represents the image domain, $\mu_i$ represent the mean intensity values for each of the $2^k$ pdfs, the $\omega_i$'s are used to penalized classes with a high intensity variance, and $\lambda$ is a constant. This function yields the following k Euler-Lagrange equations:

$$\lambda \Delta L_i = \sin(2L_i) \sum_{j=1}^{2^k} \sigma_{ij} \omega_j (I - \mu_j)^2 \prod_{l=1, l \neq i}^{k} M^2(L_l)$$

where $\sigma_{ij} = 1$ if $M(L_i) = \cos(L_i)$ and $\sigma_{ij} = -1$ if $M(L_i) = \sin(L_i)$ for $i \neq j$. The gradient flow corresponding to this Euler-Lagrange equation is $$\frac{dL_i(t)}{dt} = -\frac{1}{\lambda} \sin(2L_i(t)) \sum_{j=1}^{2^k} \sigma_{ij} \omega_j (I - \mu_j)^2 \prod_{l=1, l \neq i}^{k} M^2(L_l(t)) + \Delta L_i(t),$$

subject to the boundary condition $$\frac{\partial \Delta L_i(t)}{\partial n} = 0$$

on $\partial \Omega$. Again, this gradient flow comprises k equations in each of the auxiliary functions $L_i$. At step 35, this gradient flow is numerically integrated over time using a semi-implicit scheme, with the $L_i$'s being initialized to a constant. Once a solution for the $L_i$'s has been obtained, the weighting functions $A_i$ can be obtained from the defining equation $$A_i = \prod_{j=1}^{k} M(L_i)^2,$$

and, at step 36, a $2^k$-phase segmentation of the original image is obtained from $\Omega_i = \{x | \Pi_{j=1, j \neq i}^{2^k} (A_i - A_j) > 0\}$, where each $\Omega_i$ represents a disjoint segment or partition of the image. The union of all partitions $\Omega_i$ represents the whole image. This partition represents the degree to which an image point x belongs to the range represented by each of the weighting functions, or in other words, the membership of each point x in the segment represented by the weighting function $A_i$.

A segmentation method according to an embodiment of the invention was tested using 2 indicator functions initialized as $$L = M = \frac{\pi}{4}.$$

The intensity distribution density was approximated as a sum of 4 Gaussians, with mean values being $\mu_a, \mu_b, \mu_c, \mu_d$. The model parameters $\omega_a, \omega_b, \omega_c,$ and $\omega_d$ and $\lambda$ were chosen empirically.

Figure 1A:
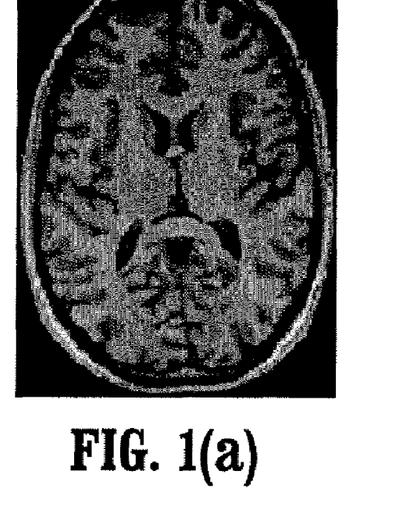
FIGS. 1(a)-(b) depict, respectively, the result of a 3-phase segmentation of one slice of a brain MR image, ands the result for a 4-phase segmentation of a brain MR image, according to an embodiment of the invention.
Figure 1B:
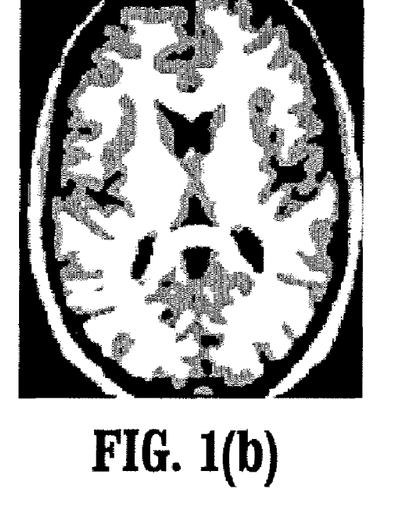
Figure 2:
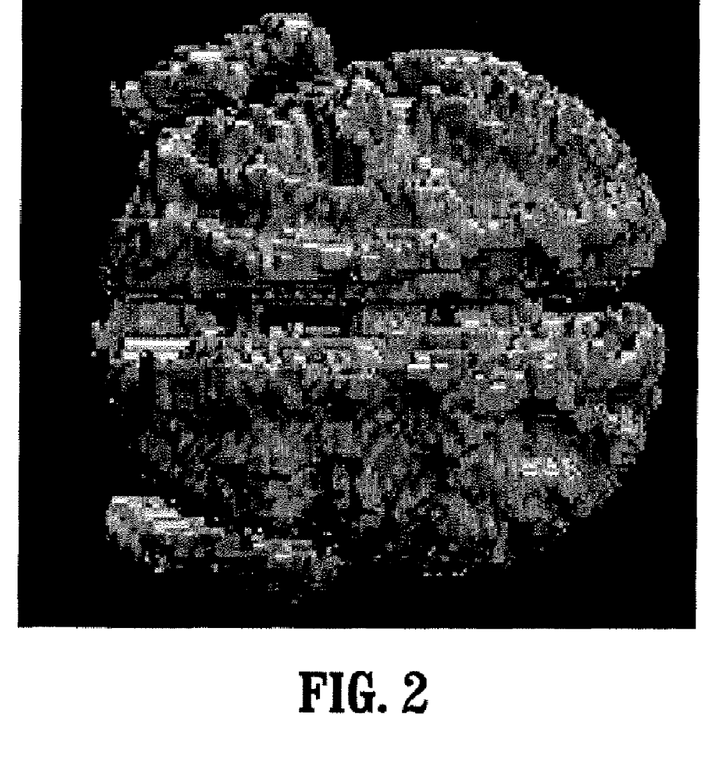
FIG. 2 depicts a surface rendering of the class corresponding to the cortex, according to an embodiment of the invention.

FIG. 1(a) depicts the result of a 3-phase segmentation of one slice of a brain MR image, while FIG. 1(b) presents the result for a 4-phase segmentation of a brain MR image, starting from a low resolution sub-sampled 3D dataset. FIG. 2 depicts a surface rendering of the class corresponding to the cortex.

It is to be understood that various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Furthermore, it is to be understood that the present invention can be implemented in various forms of hardware, software, firmware, special purpose processes, or a combination thereof. In one embodiment, the present invention can be implemented in software as an application program tangibly embodied on a computer readable program storage device. The application program can be uploaded to, and executed by, a machine comprising any suitable architecture.

Figure 4:
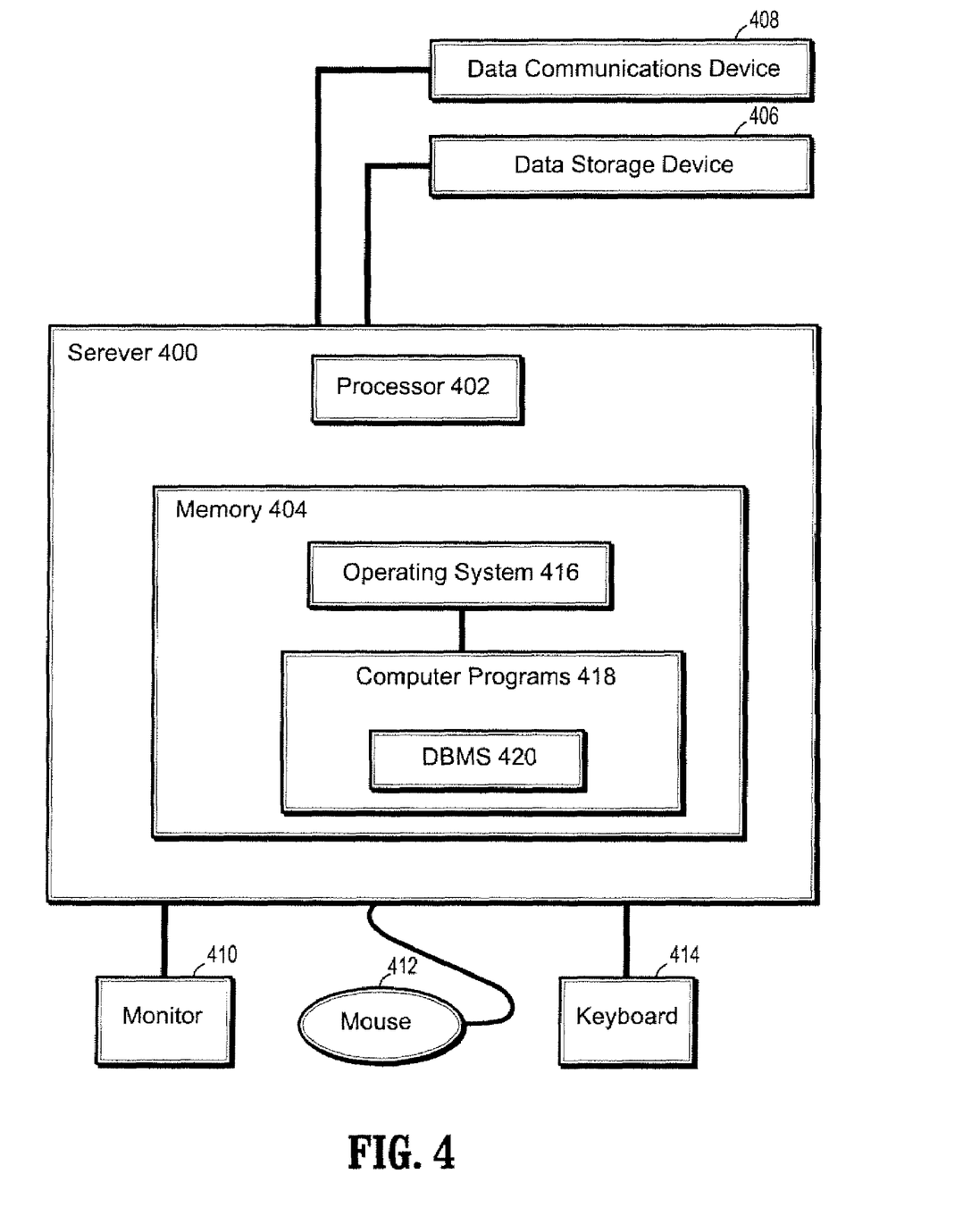
FIG. 4 is a block diagram of an exemplary computer system for implementing a method for multiphase segmentation according to an embodiment of the invention.

Accordingly, FIG. 4 illustrates a hardware environment used to implement the present invention. As illustrated in FIG. 4, in the preferred embodiment the present invention is implemented in a server computer ("server") 400. The server 400 generally includes, a processor 402, a memory 404 such as a random access memory (RAM), a data storage device 406 (e.g., hard drive, floppy disk drive, CD-ROM disk drive, etc.), a data communication device 408 (e.g., modem, network interface device, etc.), a monitor 410 (e.g., CRT, LCD display, etc.), a pointing device 412 (e.g., a mouse, a track ball, a pad or any other device responsive to touch, etc.) and a keyboard 414. It is envisioned that attached to the computer 400 may be other devices such as read only memory (ROM), a video card drive, printers, a signal source 422, and other peripheral devices including local and wide area network interface devices, etc. One of ordinary skill in the art will recognize that any combination of the above system components may be used to configure the server 400.

The server 400 operates under the control of an operating system ("OS") 416, such as Linux, WINDOWS™, WINDOWS NT™, etc., which typically, is loaded into the memory 404 during the server 400 start-up (boot-up) sequence after power-on or reset. In operation, the OS 416 controls the execution by the server 400 of computer programs 418, including server and/or client-server programs. Alternatively, a system and method in accordance with the present invention may be implemented with any one or all of the computer programs 418 embedded in the OS 416 itself to process the signal from the signal source 422 without departing from the scope of an embodiment of the invention. Preferably, however, the client programs are separate from the server programs and may not be resident on the server.

The OS 416 and the computer programs 418 each comprise computer readable instructions which, in general, are tangibly embodied in or are readable from a media such as the memory 404, the data storage device 406 and/or the data communications device 408. When executed by the server 400, the instructions cause the server 400 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 400 is typically used as a part of an information search and retrieval system capable of receiving, retrieving and/or dissemination information over the Internet, or any other network environment. One of ordinary skill in the art will recognize that this system may include more than one of server 400.

In the information search and retrieval system, such as a digital library system, a client program communicates with the server 400 by, inter alia, issuing to the server search requests and queries. The server 400 then responds by providing the requested information. The digital library system is typically implemented using a database management system software (DBMS) 420. The DBMS 420 receives and responds to search and retrieval requests and termed queries from the client. In the preferred embodiment, the DBMS 420 is server-resident.

Objects are typically stored in a relational database connected to an object server, and the information about the objects is stored in a relational database connected to a library server, wherein the server program(s) operate in conjunction with the (DBMS) 420 to first store the objects and then to retrieve the objects. One of ordinary skill in the art will recognize that the foregoing is an exemplary configuration of a system which embodies the present invention, and that other system configurations such as an ultrasound machine coupled to a workstation via network to access the data in the ultrasound machine may be used without departing from the scope and spirit of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting a digitized medical image using a processor to perform the steps of:
   providing a digitized image comprising a plurality of intensities corresponding to a domain of points on a n-dimensional grid;
   modeling the segmentation phases of said image with $2^k$ weighting functions defined as a product of k unknown auxiliary functions;
   minimizing an energy functional of said weighting functions and said auxiliary functions to derive k gradient flow equations for said auxiliary functions;
   numerically integrating said gradient flow equations wherein solutions for the k unknown auxiliary functions are obtained; and
   partitioning said image into segments based on a membership of each image point in each of said weighting functions.

2. The method of claim 1, further comprising deriving Euler-Lagrange equations for minimizing an integrand of said energy functional, wherein said gradient flow equations are derived from said Euler Lagrange equations.

3. The method of claim 2, wherein said energy functional E includes the terms $$E = \int_\Omega \left( \sum_{i=1}^{2^k} A_i \cdot \omega_i \cdot (I - \mu_i)^2 \right) dx + \lambda \int_\Omega \left( \sum_{i=1}^{k} \|\nabla L_i\|^2 \right) dx,$$

wherein I represents the image, $\Omega$ represents the image domain, $A_i$ represents the weighting functions, $\mu_i$ represent the mean intensity values for each of $2^k$ segments, $\lambda$ is an empirically determined constant, and $L_i$ represents the unknown auxiliary functions.

4. The method of claim 3, further comprising modeling said image intensities as a sum of $2^k$ probability distribution functions and computing said mean values from each of said distribution functions.

5. The method of claim 4, wherein said probability distribution functions are Gaussian functions, wherein each said function models a portion of said image intensity range.

6. The method of claim 1, wherein said weighting functions satisfy a unit norm constraint.

7. The method of claim 6, wherein each said weighting function $A_i$ is defined in terms of said auxiliary functions L according to $$A_i = \prod_{j=1}^{k} M_j^2,$$

wherein $M_i = \cos(L_i)$ or $\sin(L_i)$.

8. The method of claim 7, wherein the gradient flow equations include the terms $$\frac{dL_i(t)}{dt} = -\frac{1}{\lambda}\sin(2L_i(t))\sum_{j=1}^{2^k}\sigma_{ij}\omega_j(I-\mu_j)^2\prod_{l=1,l\neq i}^{k}M^2(L_l(t)) + \Delta L_i(t),$$

wherein I represents the image, $\mu_i$ represent the mean intensity values for each of $2^k$ segments, $\lambda$ is an empirically determined constant, $\omega_j$ is empirically chosen to penalize a segment with a high intensity variance, $\sigma_{ij}=1$ if $M(L_i)=\cos(L_i)$ and $\sigma_{ij}=-1$ if $M(L_i)=\sin(L_i)$ for i=j, and wherein $$\frac{\partial \Delta L_i(t)}{\partial n} = 0$$

on $\partial\Omega$.

9. The method of claim 1, wherein the gradient flow equations are integrated by a semi-implicit method.

10. The method of claim 1, wherein partitioning said image comprises defining segments $\Omega_i$ according to $\Omega_i=\{x|\Pi_{j=1,j\neq i}^{2^k}(A_i-A_j)>0\}$, wherein x is a point in said image domain, and $A_i$ and $A_j$ are weighting functions.

11. A method of segmenting a digitized medical image using a processor to perform the steps of:

providing a digitized image comprising a plurality of intensities corresponding to a domain of points on a n-dimensional grid;

modeling the segmentation phases of said image with $2^k$ weighting functions defined as a product of k unknown auxiliary functions; and minimizing an energy functional of said weighting functions and said auxiliary functions to derive k equations for said auxiliary functions, wherein said image is partitioned into $2^k$ segments $\Omega_i$ based on a membership of each image point in each of said weighting functions according to $\Omega_i=\{x|\Pi_{j=1,j\neq i}^{2^k}(A_i-A_j)>0\}$, wherein x is a point in said image domain, and $A_i$ and $A_j$ are weighting functions.

12. The method of claim 11, wherein said k equations for said auxiliary functions comprise gradient flow equations, and further comprising numerically integrating said gradient flow equations wherein solutions for the k unknown auxiliary functions are obtained.

13. A program storage device readable by a computer, tangibly embodying a program of instructions executable by the computer to perform the method steps for segmenting a digitized medical image comprising the steps of:

providing a digitized image comprising a plurality of intensities corresponding to a domain of points on a n-dimensional grid;

modeling the segmentation phases of said image with $2^k$ weighting functions defined as a product of k unknown auxiliary functions;

minimizing an energy functional of said weighting functions and said auxiliary functions to derive k gradient flow equations for said auxiliary functions;

numerically integrating said gradient flow equations wherein solutions for the k unknown auxiliary functions are obtained; and partitioning said image into segments based on a membership of each image point in each of said weighting functions.

14. The computer readable program storage device of claim 13, the method further comprising deriving Euler-Lagrange equations for minimizing an integrand of said energy functional, wherein said gradient flow equations are derived from said Euler Lagrange equations.

15. The computer readable program storage device of claim 14, wherein said energy functional E includes the terms $$E = \int_{\Omega}\left(\sum_{i=1}^{2^k} A_i \cdot \omega_i \cdot (I-\mu_i)^2\right)dx + \lambda\int_{\Omega}\left(\sum_{i=1}^{k}\|\nabla L_i\|^2\right)dx,$$

wherein I represents the image, $\Omega$ represents the image domain, $A_i$ represents the weighting functions, $\mu_i$ represent the mean intensity values for each of $2^k$ segments, $\lambda$ is an empirically determined constant, and $L_i$ represents the unknown auxiliary functions.

16. The computer readable program storage device of claim 15, the method further comprising modeling said image intensities as a sum of $2^k$ probability distribution functions and computing said mean values from each of said distribution functions.

17. The computer readable program storage device of claim 16, wherein said probability distribution functions are Gaussian functions, wherein each said function models a portion of said image intensity range.

18. The computer readable program storage device of claim 13, wherein said weighting functions satisfy a unit norm constraint.

19. The computer readable program storage device of claim 18, wherein each said weighting function $A_i$ is defined in terms of said auxiliary functions L according to $$A_i = \prod_{j=1}^{k} M_j^2,$$

wherein $M_i = \cos(L_i)$ or $\sin(L_i)$.

20. The computer readable program storage device of claim 19, wherein the gradient flow equations include the terms $$\frac{dL_i(t)}{dt} = -\frac{1}{\lambda}\sin(2L_i(t))\sum_{j=1}^{2^k}\sigma_{ij}\omega_j(I-\mu_j)^2\prod_{l=1,l\neq i}^{k}M^2(L_l(t)) + \Delta L_i(t),$$

wherein I represents the image, $\mu_i$ represent the mean intensity values for each of $2^k$ segments, $\lambda$ is an empirically determined constant, $\omega_j$ is empirically chosen to penalize a segment with a high intensity variance, $\sigma_{ij}=1$ if $M(L_i)=\cos(L_i)$ and $\sigma_{ij}=-1$ if $M(L_i)=\sin(L_i)$ for i=j, and wherein $$\frac{\partial \Delta L_i(t)}{\partial n} = 0$$

on $\partial \Omega$.

21. The computer readable program storage device of claim 13, wherein the gradient flow equations are integrated by a semi-implicit method.

22. The computer readable program storage device of claim 13, wherein partitioning said image comprises defining segments $\Omega_i$ according to $\Omega_i = \{x | \Pi_{j=1, j\neq i}^{2^k}(A_i - A_j) > 0\}$, wherein x is a point in said image domain, and $A_i$ and $A_j$ are weighting functions.

* * * * *